(12) United States Patent
Jensen

(10) Patent No.: US 9,377,151 B2
(45) Date of Patent: Jun. 28, 2016

(54) METHOD FOR MANUFACTURING AN INSULATED PIPE USING A BAG

(75) Inventor: Knud Hjort Jensen, Nykobing Mors (DK)

(73) Assignee: LOGSTOR A/S, Løgstør (DK)

( * ) Notice: Subject to any disclaimer, the term of this patent is extended or adjusted under 35 U.S.C. 154(b) by 515 days.

(21) Appl. No.: 13/806,354

(22) PCT Filed: Jun. 23, 2011

(86) PCT No.: PCT/EP2011/060560
§ 371 (c)(1),
(2), (4) Date: Apr. 15, 2013

(87) PCT Pub. No.: WO2012/004135
PCT Pub. Date: Jan. 12, 2012

(65) Prior Publication Data
US 2013/0185923 A1    Jul. 25, 2013

(30) Foreign Application Priority Data

Jul. 5, 2010 (EP) ..................................... 10006907

(51) Int. Cl.
*F16L 59/14* (2006.01)
*B29C 44/12* (2006.01)
*B29L 23/00* (2006.01)

(52) U.S. Cl.
CPC ............. *F16L 59/14* (2013.01); *B29C 44/1242* (2013.01); *F16L 59/143* (2013.01); *B29L 2023/225* (2013.01); *Y10T 29/4998* (2015.01); *Y10T 29/49982* (2015.01); *Y10T 29/49984* (2015.01)

(58) Field of Classification Search
CPC .... F16L 59/14; F16L 59/143; B29C 44/1242; B29C 70/68; Y10T 29/4998; B29L 2023/225
USPC ............... 29/527.1–527.3; 264/279, 250, 316
See application file for complete search history.

(56) References Cited

U.S. PATENT DOCUMENTS

| | | | | |
|---|---|---|---|---|
| 3,359,351 A | * | 12/1967 | Bender | ........................ 264/46.9 |
| 3,698,440 A | * | 10/1972 | Matthieu et al. | .............. 138/149 |
| 3,705,221 A | * | 12/1972 | Lee | ................. 264/46.4 |
| 4,022,248 A | * | 5/1977 | Hepner et al. | ................ 138/141 |
| 4,307,053 A | * | 12/1981 | Daws et al. | .................... 264/165 |

(Continued)

FOREIGN PATENT DOCUMENTS

| | | | | |
|---|---|---|---|---|
| DE | 38 43 375 A1 | 6/1990 | | |
| DE | 3843375 A1 | * | 6/1990 | .............. B29C 67/20 |

(Continued)

*Primary Examiner* — Moshe Wilensky
*Assistant Examiner* — Bayan Salone
(74) *Attorney, Agent, or Firm* — Knobbe, Martens, Olson & Bear, LLP

(57) ABSTRACT

The present invention relates to a method for manufacturing an insulated pipe comprising an inner pipe, an insulation material and a casing. The manufacturing method of the present invention concerns in particular the process of molding an insulation material onto the inner pipe, comprising the step of covering the inner pipe with a closed bag with open ends and subsequently inserting the bag covered inner pipe into a mold. Hereafter the insulation material is injected in a liquid state into the mold between the inner pipe and the bag. The insulation material in a liquid state will after injection start to expand and finally solidify. During those processes, the bag is pressed towards the inner wall of the mold.

20 Claims, 2 Drawing Sheets

(56) References Cited

U.S. PATENT DOCUMENTS

| | | | |
|---|---|---|---|
| 4,458,723 A * | 7/1984 | Nojiri et al. | 138/149 |
| 4,581,804 A * | 4/1986 | McLaughlin | 29/451 |
| 5,131,688 A * | 7/1992 | Tricini | 285/53 |
| 7,528,320 B2 * | 5/2009 | Rudi et al. | 174/36 |
| 7,824,595 B2 * | 11/2010 | Appleby et al. | 264/316 |
| 8,122,914 B2 * | 2/2012 | Menardo et al. | 138/114 |
| 8,327,530 B2 * | 12/2012 | Damour et al. | 29/745 |
| 2006/0032588 A1 * | 2/2006 | Appleby et al. | 156/425 |
| 2007/0074778 A1 * | 4/2007 | Berti et al. | 138/145 |
| 2009/0205737 A1 | 8/2009 | Dinon et al. | |
| 2010/0024911 A1 * | 2/2010 | Menardo et al. | 138/112 |
| 2010/0095520 A1 * | 4/2010 | Damour et al. | 29/745 |

FOREIGN PATENT DOCUMENTS

| | | | |
|---|---|---|---|
| EP | 0 887 605 A2 | 12/1998 | |
| EP | 0887605 | * 12/1998 | F25D 23/06 |
| EP | 2060843 | 5/2009 | |
| RU | 2344930 | 1/2009 | |

\* cited by examiner

METHOD FOR MANUFACTURING AN INSULATED PIPE USING A BAG

FIELD OF THE INVENTION

In the industry of district heating/cooling it is known to manufacture an insulated pipe that comprises an inner pipe, surrounded by a layer of insulation material, which again is covered by a casing. The inner pipe and the casing can be made of polymer-based materials and metals. Typically, the insulation pipes are though embodied with an inner pipe of metal, a closed-cell and/or solid thermal insulation layer (insulation material) and a polymer-based casing.

It is known to manufacture the insulation material onto the inner pipe using a mould. This method employs a mould typically comprised by to half parts. The inner pipe is placed centrally inside the mould forming a cavity between the outer surface of the inner pipe and the inside of the mould half parts. When the two half parts are closed around the inner pipe, liquid insulation material is injected into the mould cavity. The liquid insulation material expands until it reaches the wall of the mould cavity and subsequently solidifies. After solidification the mould half parts are opened and the insulated pipe is now ready to be covered with a casing. As mentioned, the casing is typically polymer-based and is extruded onto the insulation material.

This known manufacturing process is, however, encumbered with a number of drawbacks. One is that the insulation material can have a tendency to adhere to the wall of the mould cavity. It can therefore be difficult to open the mould without damaging and tearing parts of the solidified insulation material off. In addition, remaining solidified insulation material will have to be removed from the wall of the mould cavity, before a new moulding process can be initiated.

Another drawback of this manufacturing process is that it can be difficult to get the casing to adhere sufficiently to the insulation material. The problem occurs as a direct result of the known moulding technique used. The mould half parts are essentially needed to ensure that the manufactured insulated pipe will have the required dimensions and tolerances. In order to keep these dimensions and tolerances the mould cannot be opened before the injected liquid insulation material has expanded and solidified. Expanding insulation material is adherent whereas solidified insulation material is not. Attempting to adhere the casing material to the solidified insulation material is therefore very difficult if not impossible. After exiting the mould, an adhesive will therefore have to be added to the solidified insulation material so as to ensure a bonding between the solidified insulation material and the casing.

An alternative to the closed moulding technique described above is to use an open mould technique. Traditionally, the mould half parts are hingedly connected to each other at the bottom, such that the mould opens at its top symmetrically relative to a vertical axis. By using this open mould technique it is possible to inspect the foaming (expansion) process of the insulation material and thereby control the foaming process. However this manufacturing technique requires great precision in timing the closure of the mould—primarily to keep the expanding insulation material inside the mould. To avoid tearing of pieces of insulation material when opening the mould after expansion and solidification of the insulation material it is known to insert a piece of foil into the mould together with the inner pipe. The piece of foil lies on the inner wall of the mould and extends outside the mould at its opening. Following the liquid insulation material is injected or poured onto the foil. Regardless of whether the foil is used, this manufacturing technique is known to produce insulated pipes with varying quality, which essentially is undesired.

SUMMARY OF THE INVENTION

The present invention relates to a method for manufacturing an insulated pipe comprising an inner pipe, an insulation material and a casing. The manufacturing method of the present invention concerns in particular the process of moulding an insulation material onto the inner pipe, where the inner pipe is covered by a closed bag having open ends and then inserted into a mould. Hereafter the insulation material is injected in a liquid state into the mould between the inner pipe and the bag. The insulation material in a liquid state will after injection start to expand and finally solidify. During those processes, the bag is pressed towards the inner wall of the mould. Hence, the expanded and solidified insulation material facing the inner wall of the mould will be covered by the bag. Further and alternative steps to the manufacturing method of the present invention appear from the claims and the accompanying figures and description.

The manufacturing method of the present invention is advantageous as the insulated pipe can be taken out of the mould without breaking pieces of the insulation material off. This significantly increases the production yield. Further, the manufacturing method effectively eliminates any leak or waste of insulation material. Thus, the manufacturing method of the present invention is both simple and reliable, and secures that a uniform product quality is obtained in all the insulated pipes produced.

In addition, the bag covered insulation material imparts additional advantageous features to the process of applying a casing to the insulated pipe. Hence, the bag ensures a sufficient adhesion between the insulation material and the casing. The quality of the finished insulated pipe is thus improved considerably by the bonding that is obtained between the insulation material and the casing. The long time insulation values of the finished insulated pipe can for example be further improved by using a bag with a diffusion barrier that prohibits infusion of oxygen to the insulation material.

Oxygen combined with high temperatures is known to increase the ageing process of the insulation material, which essentially reduces insulation efficiency.

BRIEF DESCRIPTION OF THE DRAWINGS

In the following, the invention will be described referring to the figures, where.

DESCRIPTION OF EMBODIMENTS

Figure 1:
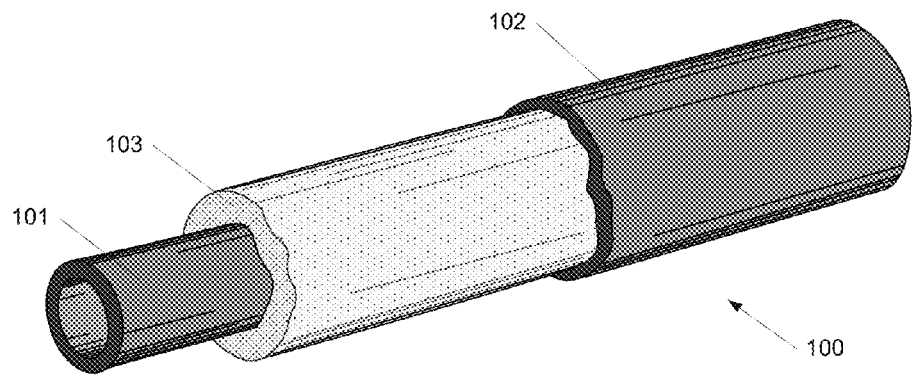
FIG. 1 illustrates an insulated pipe of the prior art.

FIG. 1 illustrates an insulated pipe 100 known in the art, comprising an inner pipe 101, surrounded by a layer of insulation material 103, which again is covered by a casing 102. The inner pipe 101 and the casing 102 can be made of polymer-based materials and metals. In the context of the present invention, the insulated pipe 100 is embodied with an inner pipe 101 of metal or polymer, a closed-cell and solid thermal insulation layer 103 and a polymer-based casing 102.

Figure 2A:
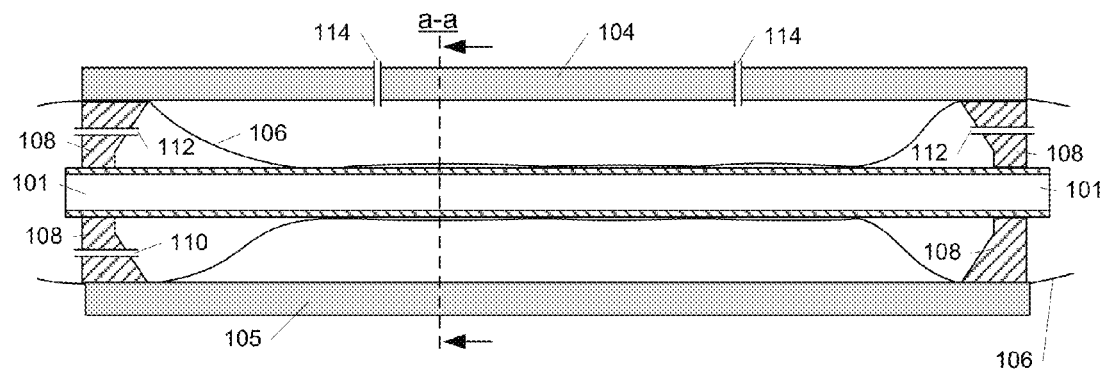
FIGS. 2a and 2b illustrate a mould closed around an inner pipe and a cross section thereof, where a bag is partly placed around the inner pipe.
Figure 2B:
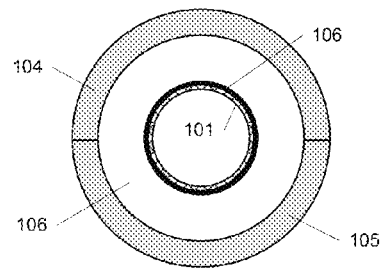

FIG. 2a illustrates a longitudinal cut of a mould 104, 105 closed around an inner pipe 101, where a bag 106 is placed around the inner pipe 101. The bag 106 has a tube-like shape with open ends. It is pulled over the inner pipe prior to inserting it into the mould 104, 105. FIG. 2b illustrates a cross section a-a of FIG. 2a. The mould comprises an upper mould half part 104 and a lower mould half part 105. The two mould half parts have a horizontally oriented sealing surface. At the ends of the inner pipe 101, end tools 108 are placed around the inner pipe 101 and the bag 106 is guided around the outer circumference of the end tool 108. When the mould 104, 105 encloses the end tools 108, a cavity is formed between the mould 104, 105 and the inner pipe 101. The surface of the end tools 108 facing the cavity can have different geometries depending on the type of insulated pipes produced. Hence, the surface of the end tools 108 facing the cavity can for example be vertically straight, be inclined or be parabolic with an apex towards the end of the inner pipe 101. The contact surfaces between the inner pipe 101, the end tools 108 and mould 104, 105 are preferably hermitically closed prior to the moulding process. Thus the closed mould 104, 105 illustrated is ready to commence the moulding process where insulation material 103 in a liquid state is directed into the cavity formed by the inner pipe 101 and the bag 106 via the inlet 110. When the insulation material 103 in a liquid state enters this cavity, it will begin to expand and later solidify. The expansion process will gradually press the bag 106 towards the inner walls of the mould 104, 105. To enable the insulation material 103 in a liquid state to expand properly, the end tools 108 as well as the upper mould part 104 comprise ventilation holes 112, 114.

To avoid that the bag 106 is squeezed or damaged during handling or closing of the mould 104, 105, negative pressure can be applied via the inlet hole 110 or ventilation hole 112. Hereby the bag 106 will fit tightly around the inner pipe 101 and the end tools 108. The bag 106 can be made of many different types of material and can for example be single-layered or multilayered. The inner surface of the bag 106 can preferably be corona treated so as improve its adhesive characteristics to the insulation material 103. This will enable a better bonding between the bag 106 and the insulation material 103. The bag 106 can also comprise a layer functioning as a diffusion barrier. Further, after closing the mould around the inner pipe, the cavity between the inner pipe and the bag can be filled with pressurized air or a gas, for example an inert gas.

Figure 3A:
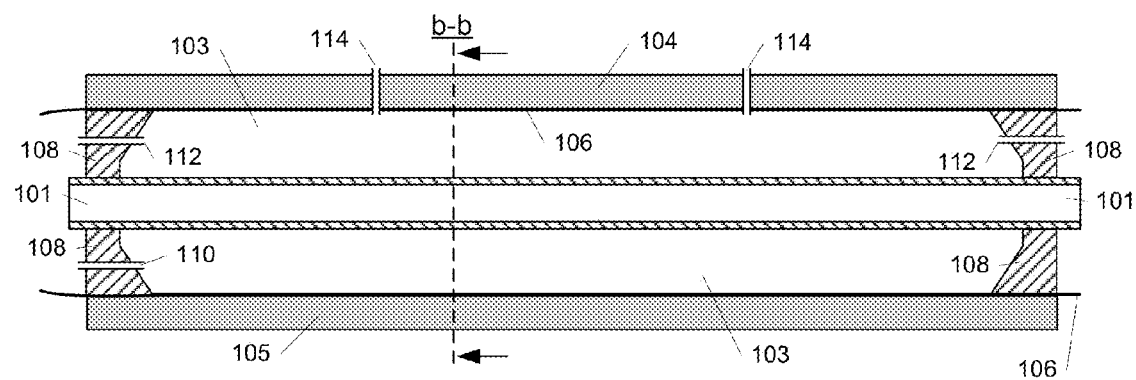
FIGS. 3a and 3b illustrate a mould closed around an inner pipe after the injected insulation material has expanded and solidified.
Figure 3B:
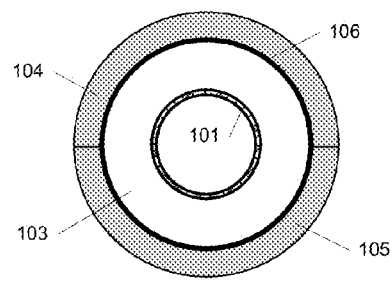

FIG. 3a illustrates a longitudinal cut of a mould 104, 105 closed around an inner pipe 101, after a moulding process where insulation material 103 has been moulded onto the inner pipe 101. The illustrated inner pipe 101 covered with solidified insulation material 103 is thus ready to exit the mould 104, 105. As apparent also from the cross section b-b of FIG. 2a depicted in FIG. 2b, the bag 106 has been pressed towards and against the inner wall of the mould 104, 105 as a result of the expansion and solidification of the insulation material 103, which was injected into the mould in a liquid state (see FIG. 2a-b). At this stage the bag 106 thus constitutes the outermost layer of the insulated inner pipe 101. The insulated inner pipe (101) is hereafter ready to leave the mould 104, 105. Hereafter the insulated inner pipe 101 is ready to be covered with a casing 102 for protecting the insulation material. As described, the bag 106 serves to obtain a better adhesion between insulation layer 103 and the casing, whereby these two layers (insulation material 103 and casing 102) will be bonded together.

The bag 106 can be a

Single-layered polymer foil, such as polypropylene or polyethylene

Multi-layered foil such as a sandwich foil with each layer having its own function, where one of them could be a diffusion barrier. The multi-layered foil could thus be a sandwich foil where a layer of metal is covered with a polymer-based material on both sides.

The dimensions (e.g. diameter, thickness) of the bag 106 can be varied, depending on the type of bag 106 (such as material and mechanical properties), the amount of insulation material 103, its expansion and solidification velocity and pressure and/or the process temperatures.

In one embodiment, the diameter of the bag 106 can be smaller than the diameter of the mold 104, 105. This requires that the elasticity of the bag 106 is such that the bag 106 can be stretched.

In one specific embodiment the material of the bag is LDPE (Low Density Poly Ethylene) and the thickness is 150 micrometer. Further, the diameter of the bag is approx. 2% smaller than the internal diameter of the mold.

An insulation material 103 covered with bag 106 of foil has a number of advantages primarily in terms of applying the casing 102 to the insulation layer 103. Hence, when the polymer-based casing 102 is applied (e.g. extruded) onto the foil (bag 106) covered surface of the insulation material 103, the heat of the casing will warm up and thus create a firm adhesion and thereby bond the casing and the insulation material together.

The end tools 108 can comprise at least one injection hole and at least one ventilation hole. In an alternative embodiment the bag 106 is placed around the entire inner pipe 101, such that the bag is placed between the inner pipe 101 and the end tool 108. The insulation material 103 in a liquid state could then be injected via a tube or the like having one end connected to the bag 106. Hereby the insulation material 103 in a liquid state could be injected into the cavity between the inner pipe 101 and the bag 106 via this tube. Hereby the entire insulation material will be covered with the bag 106 during the moulding process.

In the above an example has been given where a two part mold is being used for molding. Further, it has been mentioned that the mold is positioned having a horizontally orientated sealing surface. Any mold and positioning could of course be used.

The invention claimed is:

1. A method for manufacturing an insulated pipe comprising an inner pipe, at least one layer of insulation material, and at least one layer of casing, said manufacturing method comprises moulding said insulation material onto said inner pipe, wherein said moulding comprises the steps of:
   covering said inner pipe with a bag;
   inserting said inner pipe covered with said bag into a mould;
   injection an insulation material in a liquid state into said mould between said inner pipe and said bag, whereby said insulation material in said liquid state after injection will start to expand and finally solidify;
   removing said mould from said inner pipe with said insulation material and said bag; and
   covering said bag-covered insulation material with said at least one layer of casing, whereby the bag and the casing are bonded.

2. A method for manufacturing an insulated pipe according to claim 1, further comprising the step of applying negative and/or positive pressure between said inner pipe and said bag prior to inserting said bag-covered inner pipe into said mould.

3. A method for manufacturing an insulated pipe according to claim 1, further comprising the step of filling pressurized air and/or gas between said inner pipe and said bag prior to injecting said insulation material in a liquid state.

4. A method for manufacturing an insulated pipe according to claim 1, further comprising the step of placing an end tool with a desired geometry on the ends of said inner pipe prior to covering said inner pipe with said bag.

5. A method for manufacturing an insulated pipe according to claim 4, further comprising the step of covering the entire inner pipe with said bag prior to placing said end tool on the ends of said inner pipe.

6. A method for manufacturing an insulated pipe according to claim 5, comprising the step of injecting said insulation material in a liquid state through a tube connected to said bag.

7. A method for manufacturing an insulated pipe according to claim 6, comprising the step of injecting said insulation material in a liquid state while venting through at least one ventilation hole.

8. A method for manufacturing an insulated pipe according to claim 1, wherein during the step of injecting said insulation material in a liquid state, said insulating material moves said bag away from said inner pipe.

9. A method for manufacturing an insulated pipe according to claim 1, wherein during the step of injecting said insulation material in a liquid state, said insulating material presses said bag against an inner wall of said mould.

10. A method for manufacturing an insulated pipe according to claim 9, wherein a diameter of the bag is smaller than an inner diameter of the mould.

11. A method for manufacturing an insulated pipe according to claim 1, wherein said bag has a tube-like shape with open ends.

12. A method for manufacturing an insulated pipe comprising an inner pipe, at least one layer of insulation material, and at least one layer of casing, said manufacturing method comprises moulding said insulation material onto said inner pipe, wherein said moulding comprises the steps of:
   covering said inner pipe with a bag;
   inserting said inner pipe covered with said bag into a mould;
   injection an insulation material in a liquid state into said mould between said inner pipe and said bag, whereby said insulation material in said liquid state after injection will start to expand and finally solidify;
   removing said mould from said inner pipe with said insulation material and said bag, whereby the bag constitutes an outermost layer of the insulated pipe after removing said mould; and
   covering said bag-covered insulation material with said at least one layer of casing.

13. A method for manufacturing an insulated pipe according to claim 1, wherein after the step of injecting said insulation material in a liquid state, the bag and the insulation material are bonded.

14. A method for manufacturing an insulated pipe according to claim 1, wherein the bag comprises a single-layered polymer foil comprising a material of polypropylene or polyethylene.

15. A method for manufacturing an insulated pipe according to claim 1, wherein the bag comprises a multi-layered foil.

16. A method for manufacturing an insulated pipe according to claim 15, wherein multi-layered foil of the bag comprises a diffusion barrier.

17. A method for manufacturing an insulated pipe according to claim 15, wherein multi-layered foil of the bag comprises a layer of metal covered with a polymer-based material on both sides of the layer of metal.

18. A method for manufacturing an insulated pipe according to claim 4, wherein said bag has a tube-like shape with an open end, and wherein the open end of said bag extends past the end tool on the ends of said inner pipe.

19. A method for manufacturing an insulated pipe comprising an inner pipe, at least one layer of insulation material, and at least one layer of casing, said manufacturing method comprises moulding said insulation material onto said inner pipe, wherein said moulding comprises the steps of:
   placing an end tool with a desired geometry on the ends of said inner;
   covering said inner pipe with a bag, wherein said bag has a tube-like shape with an open end, and wherein the open end of said bag extends about an outside geometry of the end tool while tightly fitting around the inner pipe;
   inserting said inner pipe covered with said bag into a mould;
   injection an insulation material in a liquid state into said mould between said inner pipe and said bag, whereby said insulation material in said liquid state after injection will start to expand and finally solidify;
   removing said mould from said inner pipe with said insulation material and said bag; and
   covering said bag-covered insulation material with said at least one layer of casing.

20. An insulated pipe manufactured according to claim 1.

* * * * *